(12) United States Patent
Guerra

(10) Patent No.: US 9,625,328 B2
(45) Date of Patent: Apr. 18, 2017

(54) NIPPLE WITH SUBLINGUAL MEMBER

(76) Inventor: David A. Guerra, Calgary (CA)

( * ) Notice: Subject to any disclaimer, the term of this patent is extended or adjusted under 35 U.S.C. 154(b) by 1183 days.

(21) Appl. No.: 13/296,092

(22) Filed: Nov. 14, 2011

(65) Prior Publication Data

US 2013/0123846 A1 May 16, 2013

(51) Int. Cl.
*A61J 17/00* (2006.01)
*G01K 13/00* (2006.01)
*A61J 7/00* (2006.01)

(52) U.S. Cl.
CPC .......... *G01K 13/002* (2013.01); *A61J 17/001* (2015.05); *A61J 17/003* (2015.05); *A61J 7/0053* (2013.01); *A61J 17/006* (2015.05)

(58) Field of Classification Search
CPC . A61J 11/00; A61J 17/00; A61J 17/001; A61J 17/006
USPC .................. 606/234–236; 215/11.2
See application file for complete search history.

(56) References Cited

U.S. PATENT DOCUMENTS

| | | | |
|---|---|---|---|
| 1,044,737 A | 11/1912 | Bowely | |
| 3,130,725 A | 4/1964 | Greisinger | |
| 4,447,164 A | 5/1984 | Berndt | |
| 4,511,265 A | 4/1985 | Berndt | |
| 5,013,160 A | 5/1991 | Massey et al. | |
| 5,033,864 A | 7/1991 | Lasecki et al. | |
| 5,133,740 A | 7/1992 | Kussick | |
| 5,176,704 A | 1/1993 | Berndt | |
| 5,178,466 A | 1/1993 | Chiu | |
| 5,186,047 A | 2/1993 | Gordon et al. | |
| 5,211,479 A | 5/1993 | Coffey et al. | |
| 5,534,013 A * | 7/1996 | Zeindler | 606/234 |
| 5,581,238 A | 12/1996 | Chang et al. | |
| 5,611,622 A | 3/1997 | Wang | |
| 5,743,647 A | 4/1998 | Chen | |
| 5,743,648 A | 4/1998 | Zeindler | |
| 5,782,561 A | 7/1998 | Pai | |
| 2006/0072644 A1 | 4/2006 | Lee | |
| 2006/0233218 A1 | 10/2006 | Lee | |
| 2010/0063543 A1 | 3/2010 | Moses et al. | |

(Continued)

FOREIGN PATENT DOCUMENTS

| | | |
|---|---|---|
| DE | 3840178 A1 | 5/1990 |
| EP | 2189146 A1 | 5/2010 |
| GB | 2278549 A | 12/1994 |

(Continued)

*Primary Examiner* — Victor Nguyen
(74) *Attorney, Agent, or Firm* — David A. Guerra

(57) ABSTRACT

The present invention is directed towards a pacifier having a base section, an upper mouth member extending from the base section, a sublingual member extending from the base section, and a transition section connecting the upper mouth member and sublingual member. The upper mouth member is configured to be positioned adjacent a roof of a mouth of a user when in use. The sublingual member is configured to be received in a sublingual pocket of the mouth of the user located below a tongue. The transition section has a profile that defines a pocket configured to receive a portion of the tongue of the user, thereby opening the sublingual pocket and positioning the sublingual member of the pacifier in the sublingual pocket of the mouth. A temperature sensor is fitted to the sublingual member so as to acquire a body temperature of the user from the sublingual pocket.

4 Claims, 5 Drawing Sheets

(56) References Cited

U.S. PATENT DOCUMENTS

2011/0130790 A1 6/2011 Hezari et al.
2011/0137201 A1 6/2011 Fraden

FOREIGN PATENT DOCUMENTS

| JP | 7080049 A | 3/1995 |
|---|---|---|
| JP | 3011739 U | 6/1995 |
| JP | 3020615 U | 2/1996 |
| JP | 2011007582 A | 1/2011 |
| WO | 9428384 A1 | 12/1994 |
| WO | 9916405 A1 | 4/1999 |
| WO | 03088896 A1 | 10/2003 |

* cited by examiner

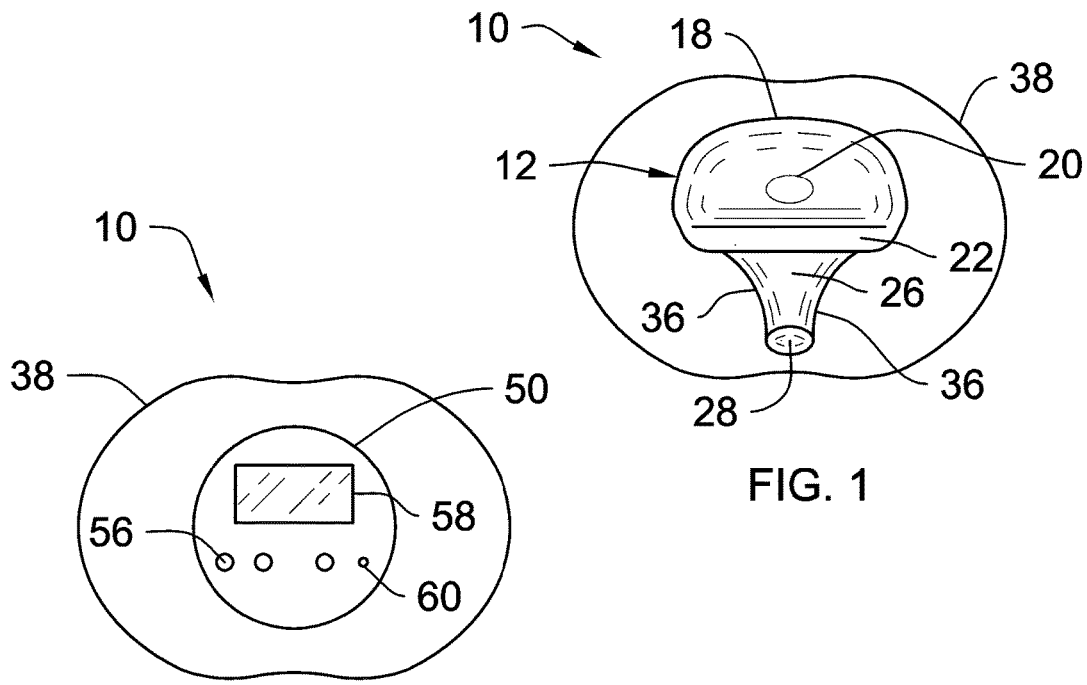
FIG. 1
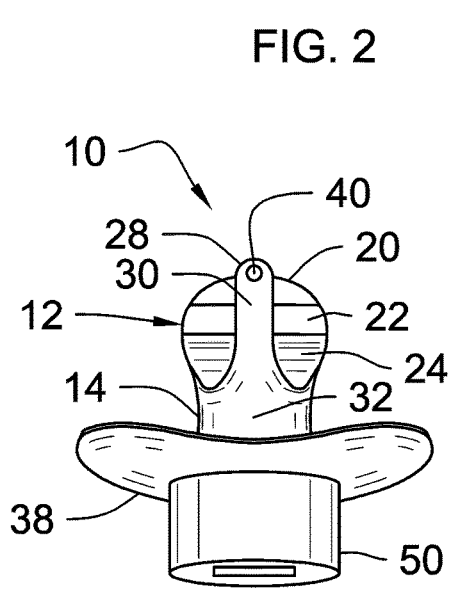
FIG. 2
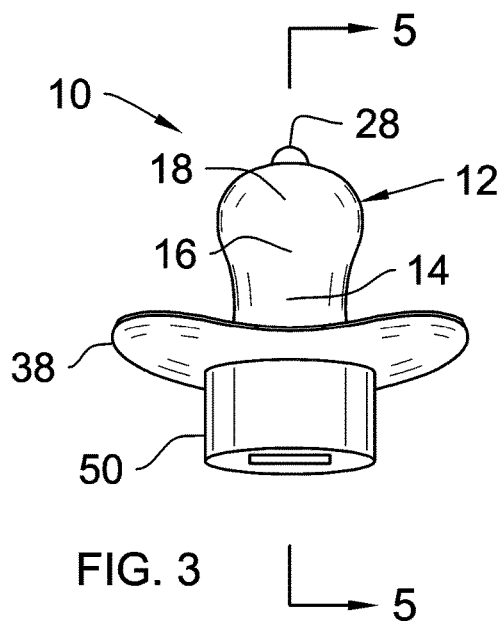
FIG. 4
FIG. 3

NIPPLE WITH SUBLINGUAL MEMBER

BACKGROUND OF THE INVENTION

Field of the Invention

The present invention relates to a pacifier or nipple with sublingual member for use in connection with positioning a portion of a pacifier under a tongue or in a sublingual pocket of a user. The portion of the pacifier located under the tongue or in the sublingual pocket can be used for massaging the sublingual pocket, administering medicate to the user, or sensing the temperature of the user while using the pacifier which promotes positioning of a temperature sensor under the tongue or in the sublingual pocket.

Description of the Prior Art

Nipples and pacifiers with a sublingual member are desirable for use with infants, animals or non-cooperating users in that they would provide an easy and efficient system to massage the sublingual pocket, administer fluids or medicate to the user, and/or sense the body temperature of the user while using the present invention as a pacifier which promotes positioning of a temperature sensor under the tongue. The present invention avoids the difficulties and problems of a user discharging a standard pacifier or thermometer out of the mouth or repositioning the pacifier or thermometer away from the area under the tongue or out of the sublingual pocket.

The use of a combination pacifier and thermometer is known in the prior art. They all incorporate a temperature sensing element within a pacifier, but the prior art does not accurately sense body temperature because the pacifier configuration used, along with the location of the temperature sensing element, is positioned above the tongue or adjacent the roof of the mouth.

Oral thermometers known in the prior art typically position the temperature sensing element under the tongue, so as to obtain a more accurate body temperature reading. A disadvantage of oral thermometers is that when used with a baby, child or non-cooperating user, the user can easily reposition the oral thermometer out from under the tongue or the sublingual pocket, willingly or unwillingly. The repositioning of the oral thermometer can produce an incorrect body temperature reading or no reading at all since the temperature sensing element is not in the user's mouth. Physically positioning the oral thermometer under the tongue or in the mouth of the user can produce stress or trauma to the user, and even injure the mouth region.

Nipples and pacifiers known in the prior art all are designed to south the user while producing a sucking action when the pacifier is placed in the user's mouth. These known nipples and pacifiers are designed to promote the user to position the pacifier between the roof of the mouth and the roof of the tongue, thereby not addressing the sublingual pocket.

While the above-described devices fulfill their respective, particular objectives and requirements, the aforementioned patents do not describe a pacifier with sublingual member that allows massaging the sublingual pocket, administering medicate to the user, and/or sensing the temperature of the user while using the pacifier which promotes positioning of a temperature sensor under the tongue or in the sublingual pocket.

Therefore, a need exists for a new and improved pacifier with a sublingual member that can be used for massaging the sublingual pocket, administering medicate to the user, and/ or sensing the temperature of the user while using the pacifier which promotes positioning of a temperature sensor under the tongue or in the sublingual pocket. In this regard, the present invention substantially fulfills this need. In this respect, the pacifier with sublingual member according to the present invention substantially departs from the conventional concepts and designs of the prior art, and in doing so provides an apparatus primarily developed for the purpose of massaging the sublingual pocket, administering medicate to the user, and/or sensing the temperature of the user while using the pacifier which promotes positioning of a temperature sensor under the tongue or in the sublingual pocket.

SUMMARY OF THE INVENTION

In view of the foregoing disadvantages inherent in the known types of pacifiers and nipples, oral thermometers, and pacifier and thermometer combinations now present in the prior art, the present invention provides an improved pacifier with sublingual member, and overcomes the above-mentioned disadvantages and drawbacks of the prior art. As such, the general purpose of the present invention, which will be described subsequently in greater detail, is to provide a new and improved pacifier with sublingual member and method which has all the advantages of the prior art mentioned heretofore and many novel features that result in a pacifier with sublingual member which is not anticipated, rendered obvious, suggested, or even implied by the prior art, either alone or in any combination thereof.

To attain this, the present invention essentially comprises a pacifier having a base section, an upper mouth member extending from the base section, a sublingual member extending from the base section, and a transition section connecting the upper mouth member and sublingual member. The upper mouth member is configured to be positioned adjacent a roof of a mouth of a user. The sublingual member is configured to be received in a sublingual pocket of the mouth of the user. The transition section has a profile that defines a pocket configured to receive a portion of a tongue of the user, thereby positioning the sublingual member in the sublingual pocket of the mouth.

The sublingual member can further have a temperature sensing unit that detects body temperature from the sublingual pocket and transmits it to a processor for processing and displays the body temperature of the user.

The upper mouth member can be located above a longitudinal axis of the pacifier, and the sublingual member can be located below the longitudinal axis of the pacifier. A substantially planar section can extend from an end section of the upper mouth member toward the base section at an angle to or parallel with the longitudinal axis of the pacifier. The transition section can include an upper and lower pocket section, with the upper pocket section having a curved profile away from the longitudinal axis of the pacifier for receiving the tip or an end portion of the tongue.

There has thus been outlined, rather broadly, the more important features of the invention in order that the detailed description thereof that follows may be better understood and in order that the present contribution to the art may be better appreciated.

The invention may also include a transmitter for wirelessly transmitting body temperature data to a remote monitoring unit which displays the body temperature of the user. The transition section may also include a biasing member for urging the sublingual member away from upper mouth member. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pacifier with sublingual member that has all of the advantages of the prior art pacifiers and nipples, oral thermometers, and combination pacifier and thermometer and none of the disadvantages.

It is another object of the present invention to provide a new and improved pacifier with sublingual member that may be easily and efficiently manufactured and marketed.

An even further object of the present invention is to provide a new and improved pacifier with sublingual member that has a low cost of manufacture with regard to both materials and labor, and which accordingly is then susceptible of low prices of sale to the consuming public, thereby making such pacifier with sublingual member economically available to the buying public.

Still another object of the present invention is to provide a new pacifier with sublingual member that provides in the apparatuses and methods of the prior art some of the advantages thereof, while simultaneously overcoming some of the disadvantages normally associated therewith.

Even still another object of the present invention is to provide a pacifier with sublingual member for massaging the sublingual pocket, administering medicate to the user, and/or sensing the temperature of the user while using the pacifier which promotes positioning of a temperature sensor under the tongue or in the sublingual pocket. This allows for an accurate body temperature reading of a baby since the present invention acts like a pacifier while positioning the temperature sensor unit in the most ideal oral location for accurately detecting body temperature.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front planar view of an embodiment of the pacifier with sublingual member constructed in accordance with the principles of the present invention, with the phantom lines depicting environmental structure and forming no part of the claimed invention.

FIG. 2 is a rear planar view of the pacifier with sublingual member of the present invention.

FIG. 3 is a top elevational view of the pacifier with sublingual member of the present invention.

FIG. 4 is a bottom elevational view of the pacifier with sublingual member of the present invention.

The same reference numerals refer to the same parts throughout the various figures.

DETAILED DESCRIPTION OF THE INVENTION

Figure 5:
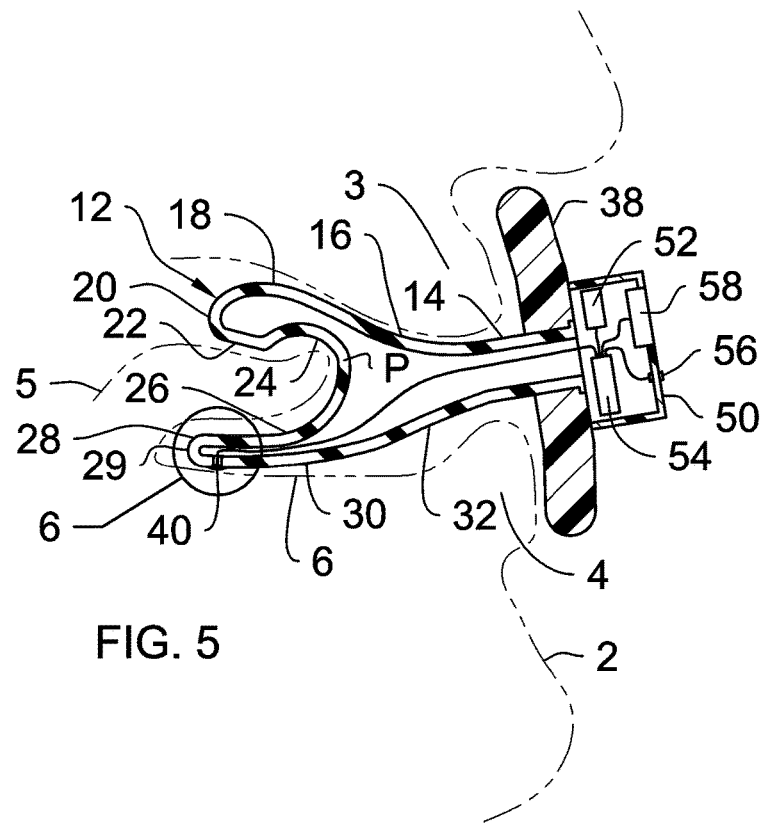
FIG. 5 is a cross-section view of the pacifier with sublingual member of the present invention taken along line 5-5 in FIG. 3.

Referring now to the drawings and particularly to FIGS. 1-11, an embodiment of the pacifier with sublingual member of the present invention is shown and generally designated by the reference numeral 10.

In FIGS. 1-4, a new and improved pacifier with sublingual member 10 of the present invention for massaging the sublingual pocket, administering medicate to the user, and/or sensing the temperature of the user while using the pacifier which promotes positioning of a temperature sensor under the tongue or in the sublingual pocket is illustrated and will be described. More particularly, the pacifier with sublingual member 10 has a pacifier 12, a lip shield 38, and an electronics housing 50. The pacifier 12 extends out from the lip shield 38 from one side, and the electronics housing 50 extends out from another side of the lip shield 38 opposite the pacifier 12.

As best illustrated in FIG. 5, the pacifier with sublingual member 10 is inserted into a mouth 2 of a user. The configuration of the pacifier with sublingual member 10 promotes the lips of the user to be positioned around a base section 14 and adjacent the lip shield 38. The configuration of the pacifier with sublingual member 10 also promotes the upper mouth member 18 to be positioned between a roof of the mouth 3 and the tongue 5, and the sublingual member 28 to be positioned in a sublingual pocket 6.

The pacifier 12 is substantially hollow and made from, but not limited to, rubber, plastic, or any other medical grade material. The pacifier 12 broadly features the base section 14 extending out from the lip shield 38, an upper mouth member 18, and a sublingual member 28. The base section 14 can contain a flange that secures the pacifier 12 to the lip shield 38, and has an opening at its free end. It can be appreciated that the base section 14 can be, but not limited to, press fitting, glued or mechanically fastened to the lip shield 38. Additionally, it can be appreciated that the base section can be, but not limited to, press fitting, glued or mechanically fastened directly to the electronics housing 50, without the lip shield 38. The upper mouth member 18 is positioned above a longitudinal axis of the pacifier 12 which can be a longitudinal axis of the base section 14, and the sublingual member 28 is positioned below the longitudinal axis of the pacifier.

An upper mouth arcuate section 16 extends from the base section 14 in an upwardly curved profile away from the longitudinal axis of the pacifier 12 that is substantially concave toward the longitudinal axis of the pacifier 12. The upper mouth arcuate section 16 then transitions to the upper mouth member 18. The upper mouth member 18 continues from the upper mouth arcuate section 16 in a substantially downwardly curving profile toward the longitudinal axis of the pacifier 12, which produces a rounded end section 20. A substantially planar section 22 extends from the end section 20 toward the base section 14 at an angle or parallel with the longitudinal axis of the pacifier 12.

An upper pocket section 24 extends from the planar section 22 toward the base section 14 in an upwardly curved profile away from the longitudinal axis of the pacifier 12. The upper pocket section 24 is configured to receive a tip or an end portion of the tongue 5. The planar section 22 and the upper pocket section 24 each or individually may contain pockets, ridges, ribs or any type of recess or protrusions (not shown), for massaging or promoting suction by the user. Additionally, the end section 20, planar section 22 and the upper pocket section 24 each or individually may contain one or more bores that are in communication with the hollow interior of the pacifier 12, so as to dispense a fluid stored in the hollow interior of the pacifier into the mouth 2 of the user when a suction force is produced by the user or when any portion of the pacifier is squeezed.

A lower pocket section 26 then extends from the upper pocket section 24 in a downwardly curved profile toward the sublingual member 28 and away from the base section 14. A portion of the lower pocket section 26 is positioned below the longitudinal axis of the pacifier 12. The upper and lower pocket sections 24, 26 are configured to produce a recess or pocket in the pacifier 12 that receives the tongue 5 of the user. The upper and lower pocket sections 24, 26 can further be configured to promote the tip of the tongue 5 to be positioned in a direction toward the roof of the mouth 3, thereby opening the sublingual pocket 6.

The sublingual member 28 has a width or diameter less than a width or diameter of the upper mouth member 18. The difference in width or diameter between the sublingual member and upper mouth member is produced by a narrowing of the lower pocket section 26 and/or the sublingual member 28. The lower pocket section 26 has tapering side sections 36 that transition the wider upper mouth section 24 to the narrower sublingual member 28, as best illustrated in FIG. 1. The width or diameter of the sublingual member 28 promotes a degree of flexibility in the sublingual member, which produces a pivot point P at or near the upper and lower pocket sections 24, 26 transition point.

The sublingual member 28 includes an end section 29 that is smooth and rounded so as not to injure or irritate the tongue 5 or the sublingual pocket 6. A lower sublingual member 30 extends from the end section 29 toward base section 14. The lower sublingual member 30 can curve upwardly toward the longitudinal axis of the pacifier 12 so as to receive a lower lip of the user. The sublingual member 28 is a flexible elongated member that can be flat or arcuate in shape.

It can be appreciated that the sublingual member 28 is not limited in extending out past the end section 20 of the upper mouth member 18, as illustrated in FIGS. 3-5. Optionally, the end section 29 of the sublingual member 28 can be parallel with the end section 20, or the end section 29 of the sublingual member 28 can be at a distance from the base section 14 that is less than a distance of the end section 20 of the upper mouth member 18 from the base section.

A lower mouth arcuate section 32 extends from the lower sublingual member 30 upwardly toward the longitudinal axis of the pacifier 12 in a generally concave profile toward the longitudinal axis of the pacifier 12. The lower mouth arcuate section 32 then transitions to the base section 14 for producing the hollow pacifier 12. The concave profile of the lower mouth arcuate section 32 is configured so as to receive the lower lip of the user.

The base section 14 has a smaller width, height or diameter than the overall width, height or diameter of the upper mouth member 18 and the sublingual member 28. The width, height or diameter of the base section 14 promotes the user to receive the pacifier 12 in the user's mouth 2, while pressing the lips of the user against the base section 14 which secures the pacifier in the user's mouth.

Figure 6:
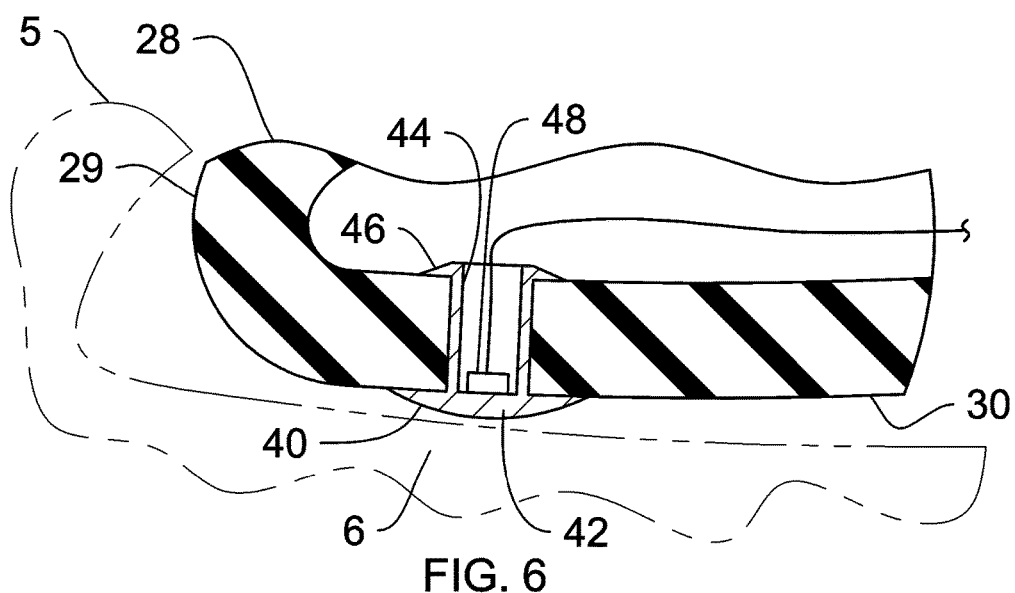
FIG. 6 is an enlarged cross-sectional view of the temperature sensing unit of the present invention.

A sensor unit 40, as best illustrated in FIG. 6, is associated with the sublingual member 28 and preferably with the lower sublingual member 30. The sensor unit 40 is made from any non-toxic thermal conductive or thermal transfer material, such as but not limited to, metals, plastics, alloys or composites. The sensor unit 40 includes an end section 42 featuring a smooth rounded end surface with an edge that is flush with the lower sublingual member 30.

A post 44 extends from a side of the end section 42 opposite the rounded end surface, and features at least one flange 46 at a free end of the post. A temperature sensor or thermistor 48 is attached to the sensor unit 40 to the side of the end section 42 opposite the rounded end surface of the end section 42. In the alternative, the temperature sensor 48 can be fitted to any part of the sensor unit 40, since the sensor unit is made from a thermal transferring material which allows for the body temperature of the user to be transmitted from the sublingual pocket through the sensor unit 40. The end section 42 provides for thermal transfer of body temperature from a posterior region of the sublingual pocket.

A bore is defined or produced in the lower sublingual member 30 so as to receive the post 44 of the sensor unit 40. The length of the post 44 is designed so that the flange 46 extends past the lower sublingual member 30 bore, thereby securing the sensor unit 40 to the lower sublingual member with the rounded end surface of the end section 42 flush with the lower sublingual member. The bore, post 44 and flange 46 configuration provides for easy assembly of the present invention, and for removal and replacement of the sensor unit 40 from the pacifier 12. The flush interconnection of the rounded end surface of the end section 42 and the lower sublingual member 30 reduces any injury to the user's lips, tongue 5 or sublingual pocket 6 when the sublingual member 28 is inserted, used or removed from the user's moth.

Figure 7:
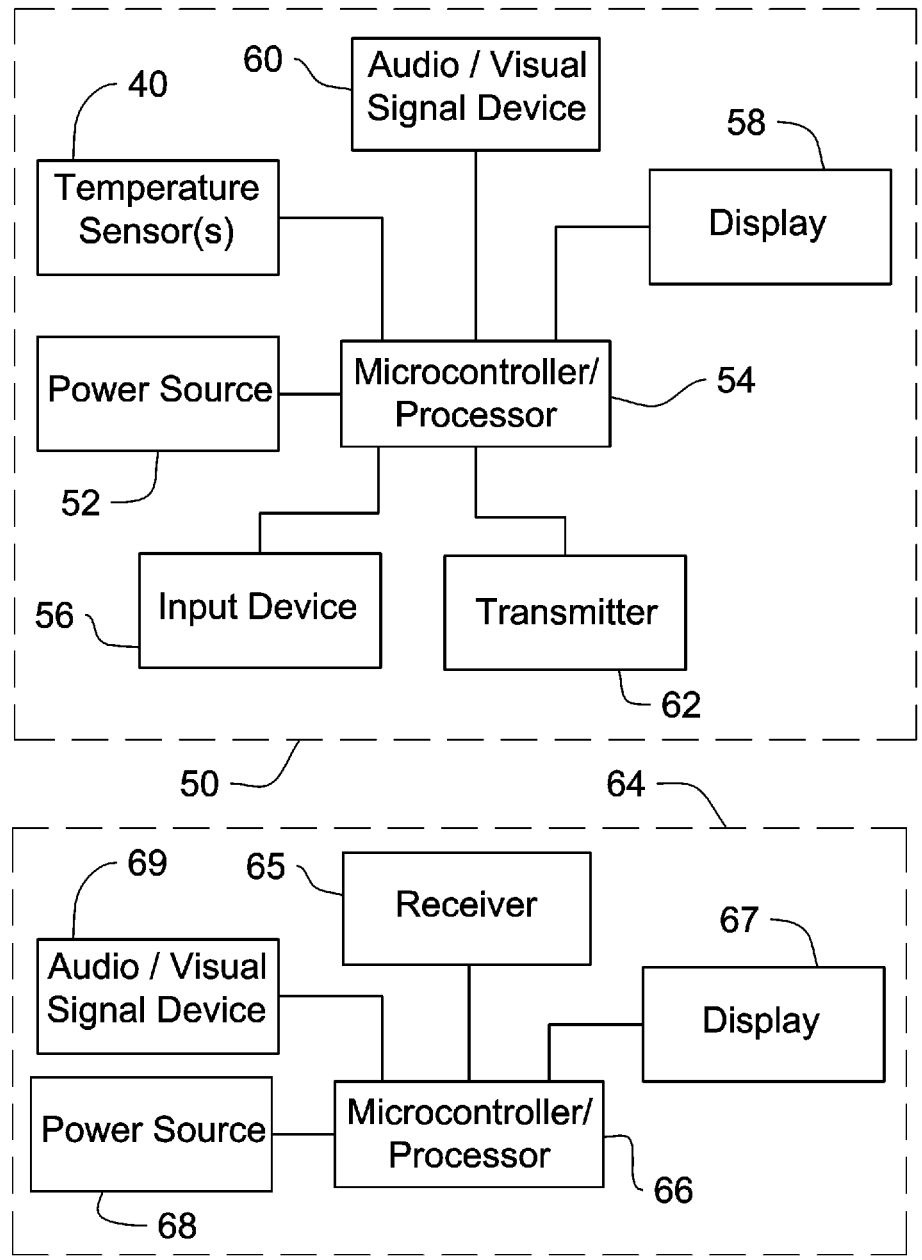
FIG. 7 is a schematic diagram of the electrical components of the present invention.

The electronics housing 50, as best illustrated in FIGS. 5 and 7 includes at least a power source 52, a microcontroller or processor 54, input devices or buttons 56, a display 58, and an audio and/or visual signal device 60. The temperature sensor 40 is in electrical communication with the processor 54 via a wire that runs from the temperature sensor 40 through the sublingual member 28, then through the opening in the base section 14 and into the electronics housing 50. The display 50 and any visual signal device 60 are located so as to be viewable from outside the electronics housing 50. The input devices 56 are configured so as to be actuated by the user. The electronics housing 50 can be water tight so as to be immersed in and/or washed with water.

As best illustrated in FIG. 7, optionally the electronics housing 50 can include a transmitter 62 that wirelessly communicates with a remote unit 64. The remote unit 64 includes a receiver 65, a microcontroller or processor 66, a display 67, a power source 68, and an audio and/or visual signal device 69. The transmitter 62 and remote unit 64 is an alternate embodiment of the present invention.

The electronics housing 50 can be integrally molded to the lip shield 38 as a solid molded piece making the housing watertight. In the alternative, the electronics housing 50 can include a removable or hinged panel (not shown) for providing access to the interior of the housing for battery 68 and/or component replacement. The panel can be configured to provide a watertight seal with the housing 50.

Figure 8:
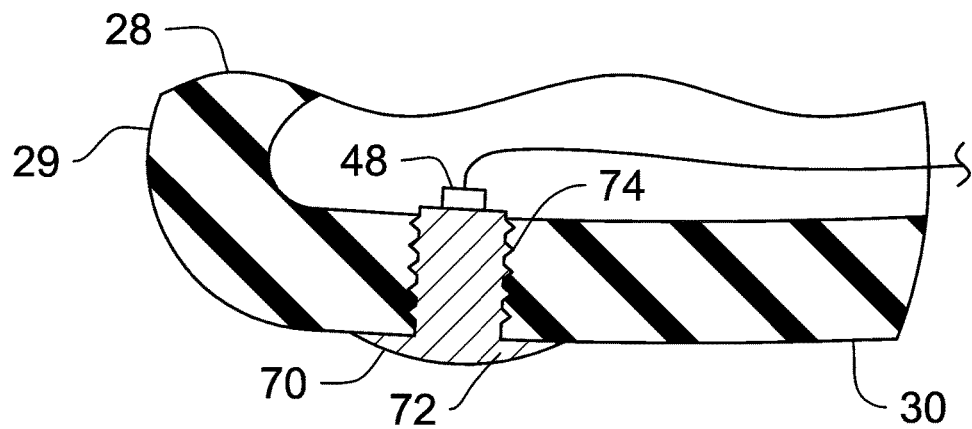
FIG. 8 is an enlarged cross-sectional view of an alternate embodiment of the temperature sensing unit of the present invention.

An alternate embodiment sensor unit 70, as best illustrated in FIG. 8, can be used which includes an end section 72, a threaded post 74, and the temperature sensor or thermistor 48. The end section 72 features a smooth rounded end surface with an edge that is flush with the lower sublingual member 30. The threaded post 74 extends from a side of the end section 72 opposite the rounded end surface, and includes external threads that engage with and secures the sensor unit 70 to a bore defined or produced in the lower sublingual member 30. The end section 72 provides for thermal transfer of body temperature from a posterior region of the sublingual pocket.

The temperature sensor 48 is attached to the sensor unit 70 directly to a side of the end section 42 opposite the rounded end surface. In the alternative, the temperature sensor 48 can be fitted to any part of the sensor unit 70, since the sensor unit is made from a thermal transferring material which allows for the body temperature of the user to be transmitted from the sublingual pocket through the sensor unit.

Figure 9:
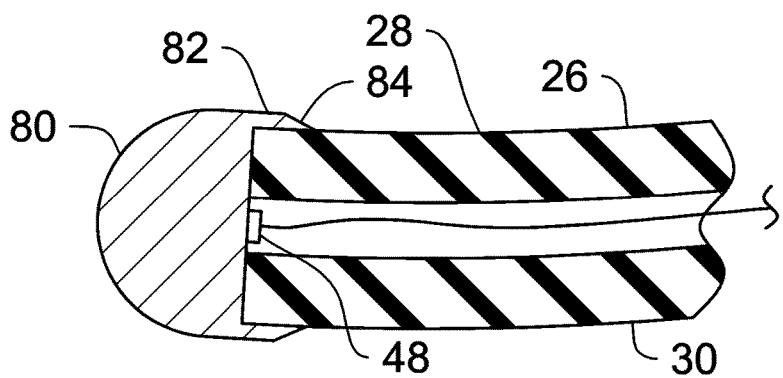
FIG. 9 is an enlarged cross-sectional view of an alternate embodiment of the temperature sensing unit of the present invention.

An alternate embodiment sensor unit 80, as best illustrated in FIG. 9, can be used which includes a rounded end section 82, a chamfered end 84, and the temperature sensor or thermistor 48. The rounded end section 82 is connected to or replaces the end section 28 of the lower sublingual member 30. The chamfered end 84 provides a smooth or flush transition from the lower sublingual member 30 to the sensor unit 80, thereby reducing injury to lips, the tongue 5 or sublingual pocket of the user 6. The rounded end section 82 provides for thermal transfer of body temperature from a posterior region of the sublingual pocket, and from a base and a posterior region of a bottom portion of the tongue.

The temperature sensor 48 is attached to the sensor unit 80 directly to a side of the end section 42 opposite the rounded end surface. In the alternative, the temperature sensor 48 can be fitted to any part of the sensor unit 80, since the sensor unit is made from a thermal transferring material which allows for the body temperature of the user to be transmitted from the sublingual pocket through the sensor unit.

Figure 10:
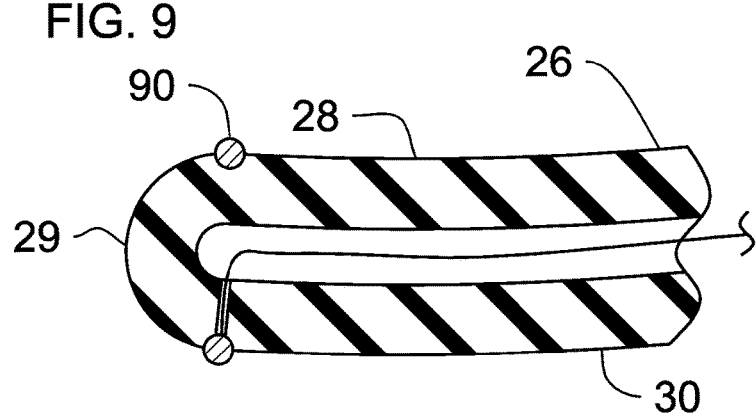
FIG. 10 is an enlarged cross-sectional view of an alternate embodiment of the temperature sensing unit of the present invention.

An alternate embodiment sensor unit 90, as best illustrated in FIG. 10, can be used which has a generally ring configuration receive and retained in a peripheral recess 28a of the sublingual member 28 near the end section 29, and a temperature sensor or thermistor (not shown). The ring sensor unit 90 provides for thermal transfer of body temperature from a posterior region of the sublingual pocket 6, and from a base and a posterior region of a bottom portion of the tongue 5.

The temperature sensor is attached to the sensor unit 90 directly to the ring sensor unit 90, and is connected to the processor 54 via a wire running through a bore defined in the sublingual member 28 that is in communication with the recess 28a.

It can be appreciated that any alternate embodiment sensor unit 40, 70, 80, 90 can be used with the pacifier 12.

Figure 11:
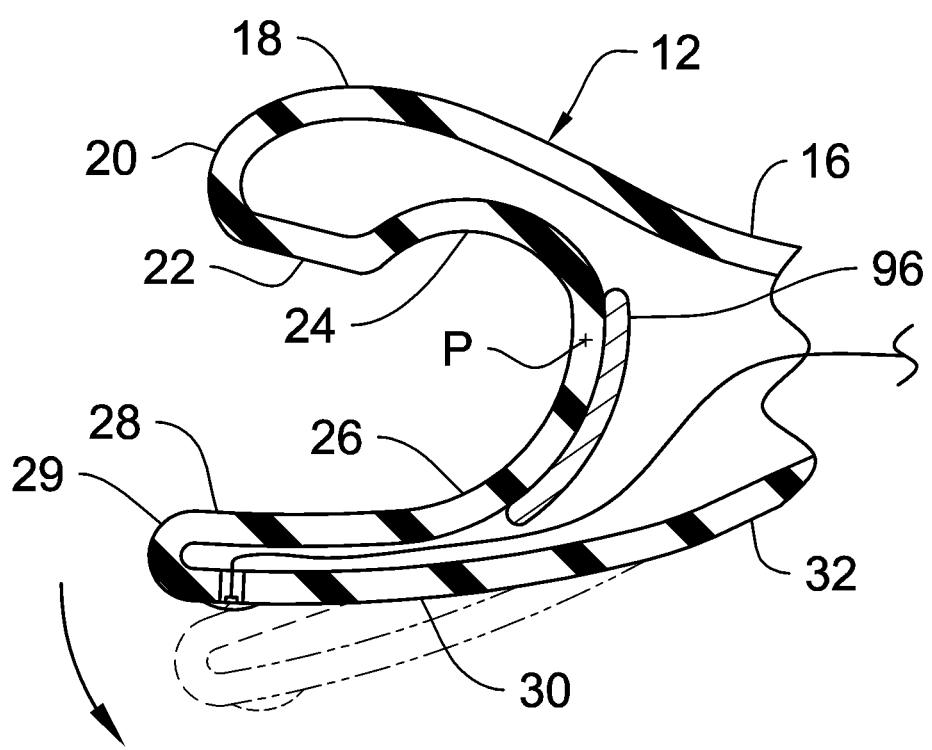
FIG. 11 is a cross-sectional view of an alternate embodiment of the pacifier with sublingual member of the present invention including a biasing member.

Additionally, the pacifier 12 can include a biasing member 96 fixed to an interior side of the lower pocket section 26, as best illustrated in FIG. 11. The biasing member 96 can be, but not limited to, a leaf spring, a coil spring, or an outwardly biasing strip.

The biasing member 96 promotes a degree of flexibility in the sublingual member, and produces a pivot point P at or near the upper and lower pocket sections 24, 26 transition point. The biasing or spring force of the biasing member 96 urges the sublingual member 28 away from the upper mouth member 18, thereby pressuring the sensor unit 40 against the sublingual pocket 6. The biasing member 96 further secures the pacifier 12 in the mouth 2 and resists removal of the pacifier from the mouth for an accurate body temperature reading. The biasing member 96 further provides a secure contact between the temperature sensor unit 48 and the sublingual pocket 6. It can be appreciated that any alternate embodiment sensor unit 40, 70, 80, 90 can be used with the pacifier 12 containing the biasing member 96

The interior side of the lower pocket section 26 can further include a recess or ridge (not shown) for receiving the biasing member 96 to assist in the assembly of the biasing member to the lower pocket section.

In use, it can now be understood that the user will receive the pacifier 12 in the mouth 2, so that the tongue 5 is received in the pocket area formed by the upper and lower pocket sections 24, 26, the upper mouth member 18 is located between the roof of the mouth 3 and the tongue 5, and the sublingual member 28 is located in the sublingual pocket 6 under the tongue 5. The tongue 5 is urged towards the roof of the mouth 3 by the upwardly curved profile of the upper pocket section 24, thereby opening the sublingual pocket 6 and positioning the temperature sensor 40 against a posterior section of the sublingual pocket. The lips of the user are then urged closed around the base section 14 due to the narrower configuration of the base section in relation to the upper mouth member 18 and sublingual member 28, thereby securing the pacifier 12 in the mouth 2 of the user.

The input device 56 is then activated and a temperature reading or signal is detected by the temperature sensor 48 and sent to the processor 54. The processor 54 then sends a processed temperature signal or reading to the display 58 for displaying an accurate body temperature of the user. An alarm or light 60 can be activated in addition to or independent of the display 58 to alert the user or third party of a temperature reading. A memory function can be activated so as to remember the temperature reading thereby allowing the present invention to be removed from the mouth 2 and the temperature reading viewed.

It can be appreciated that the configuration of the pacifier 12 promotes a more accurate body temperature reading than the prior art because the temperature sensor 48 is placed against the posterior region of the sublingual pocket 6, which is known in the medical industry to provide a very accurate body temperature reading. The pacifier 12 also pacifies the user so as to retain the pacifier 12 in the mouth 2, thereby giving the processor 54 enough time to acquire a complete body temperature reading from the temperature sensor 48.

Additionally, the remote unit 64 can be placed in another room from the pacifier with sublingual member 10, thereby allowing a parent, guardian or care giver to remotely monitor the body temperature of the user for long periods of time.

Optionally, the hollow pacifier 12 can be filled with a flavoring, fluid or medicate that can then be dispensed through at least one hole in the pacifier so as to be administered to the user. The pacifier 12 can be attached to a bottle, syringe or any other soothing device.

While embodiments of the pacifier with sublingual member have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although sensing the temperature of the user while using the pacifier which promotes positioning of a temperature sensor under the tongue or in the sublingual pocket has been described, it should be appreciated that the pacifier with sublingual member herein described is also suitable for massaging the sublingual pocket or administering medicate to the user.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pacifier comprising:
   a base section;
   an upper mouth member having a first portion extending from said base section, said upper mouth member being configured to be positioned adjacent a roof of a mouth of a user;
   a sublingual member having a first portion extending from said base section, said sublingual member being configured to be received in a sublingual pocket of the mouth of the user;
   a transition section between a second portion of said upper mouth member and a second portion of said sublingual member, said transition section having a profile that defines a pocket configured to receive a portion of a tongue of the user; and
   a temperature sensor unit fitted to said sublingual member and configured to come in contact with the sublingual pocket of the user when said pacifier is received in the mouth of the user.

2. The pacifier according to claim 1, wherein said upper mouth member further comprising an end section transitioning from said first portion of said upper mouth member, wherein said second portion of said upper mouth member is a planar section transitioning from said end section of said upper mouth member, and wherein said transition section further comprising an upper pocket section transitioning from said planar section of said upper mouth member, and a lower pocket section transitioning from said upper pocket section, wherein said upper pocket section defines a pocket configured to receive a tip of the tongue.

3. The pacifier according to claim 1, wherein said temperature sensor unit is at least one of:
   a post unit configured to be received in a bore defined in said sublingual member, said post unit having a post, a flange at a free end of said post, and an end section exterior of said sublingual member, wherein said sublingual member defines a hollow interior in communication with said bore, and said flange being configured to secure said post unit to said sublingual member;
   a threaded post unit having a post end section exterior of said sublingual member, and an externally threaded post extending from said post end section and configured to engage with a surface of said sublingual member that defines a bore in said sublingual member, wherein said sublingual member defines a hollow interior in communication with said bore; and
   a ring received in a recess defined in a periphery of said sublingual member.

4. The pacifier according to claim 1 further comprising a processor in communication with said temperature sensor unit, a power source in communication with said processor, and a display in communication with said processor.

\* \* \* \* \*